United States Patent [19]

Umeda et al.

[11] Patent Number: 5,138,129
[45] Date of Patent: Aug. 11, 1992

[54] WELDING TRANSFORMER IN A WELDING GUN FOR ROBOT

[75] Inventors: Shigeru Umeda; Tsuyoshi Takatori, both of Tokyo, Japan

[73] Assignee: Obara Corporation, Tokyo, Japan

[21] Appl. No.: 674,556

[22] Filed: Mar. 22, 1991

[30] Foreign Application Priority Data

May 9, 1990 [JP] Japan ............................ 2-47707[U]

[51] Int. Cl.$^5$ ........................................... B23K 11/24
[52] U.S. Cl. ................................................ 219/116
[58] Field of Search ............... 219/116, 86.25, 86.33, 219/89, 90; 336/210

[56] References Cited

U.S. PATENT DOCUMENTS

| | | | |
|---|---|---|---|
| 1,988,734 | 1/1935 | Helgason | 336/210 |
| 2,170,700 | 8/1939 | Von Henke | 219/116 |
| 2,762,988 | 9/1956 | Pomazal et al. | 336/210 |
| 3,436,707 | 4/1969 | Derbyshire et al. | 336/210 |
| 3,763,344 | 10/1973 | Okabe et al. | 219/116 |
| 4,559,438 | 12/1985 | Nakadate et al. | 219/90 |
| 4,663,605 | 5/1987 | Lee | 336/210 |
| 5,023,423 | 6/1991 | Tsuji et al. | 219/116 |
| 5,077,458 | 12/1991 | Takano et al. | 219/116 |

FOREIGN PATENT DOCUMENTS 60-180683 9/1985 Japan ...................... 219/116

*Primary Examiner*—Geoffrey S. Evans
*Attorney, Agent, or Firm*—Flynn, Thiel, Boutell & Tanis

[57] ABSTRACT

A welding transformer in a welding gun for robot capable of lightening the weight thereof as a whole and of reducing the assembling and disassembling process of the constituents thereof. The welding transformer is disposed within a cradle composed of a hollow frame and has a core fixed to the cradle by fastening members so as to be integrated with the cradle.

2 Claims, 2 Drawing Sheets

WELDING TRANSFORMER IN A WELDING GUN FOR ROBOT

BACKGROUND OF THE INVENTION

1. Field of the Invention

The present invention relates to a welding transformer to be used in a welding gun for robot.

2. Prior Art

A conventional welding transformer to be used in a welding gun for robot is disposed within a cradle as illustrated in FIG. 3.

The welding gun for robot having welding gun arms 11 and 12 is attached to a robot wrist by way of a cradle 13. The cradle 13 comprises a hollow frame having a pivotal mounting portion at one end thereof on which the welding gun arms 11 and 12 are pivotally mounted and an attaching portion 14 at the other end thereof to be fixed to the robot wrist. A welding transformer 15 has holding frames 16 and 16 fixed thereto at the front and rear portions and both sides thereof for holding a core of the welding transformer 15, and the holding frames 16 and 16 are fixed to the cradle 13 whereby the welding transformer 15 is disposed within and fixed to the cradle 13, which is typically disclosed in Japanese patent Publication No. 62-11950.

Inasmuch as the welding gun is movable freely by the robot, the welding transformer will be violently movable accompanied by the movement of the welding gun. Hence, the welding transformer has to be as light as possible. Furthermore, the transformer has to be replaced with another transformer depending on the kind of work.

However, since the conventional welding transformer has the holding frames 16 which are fixed to the cradle 13, the welding transformer 15 is heavy. Still furthermore, there was needed such additional assembling and disassembling operations that the welding transformer is attached to or removed from the cradle in addition to removing the cradle 13 from the robot wrist.

SUMMARY OF THE INVENTION

The present invention has been made in view of the problem of the prior art set forth just above.

It is an object of the present invention to provide a welding transformer in a welding gun for robot having a core fixed directly to a cradle so as to be integrated with the cradle, whereby the welding transformer in the welding gun for robot is light as a whole and the process for assembling the welding transformer into or disassembling the welding transformer from the cradle is reduced.

To achieve the object of the present invention, the molding transformer in a welding gun for robot comprises a cradle composed of a hollow frame and having a mounting portion at one end thereof for mounting welding gun arms thereon and an attaching portion at the other end thereof to which a robot wrist is attached, and a welding transformer provided with a core disposed within the hollow frame of the cradle, the core being fastened by fastening members and fixed to the cradle.

The above and other objects, features and advantages of the present invention will become more apparent from the following description taken in conjunction with the accompanying drawings.

DESCRIPTION OF THE PREFERRED EMBODIMENT

Figure 1:
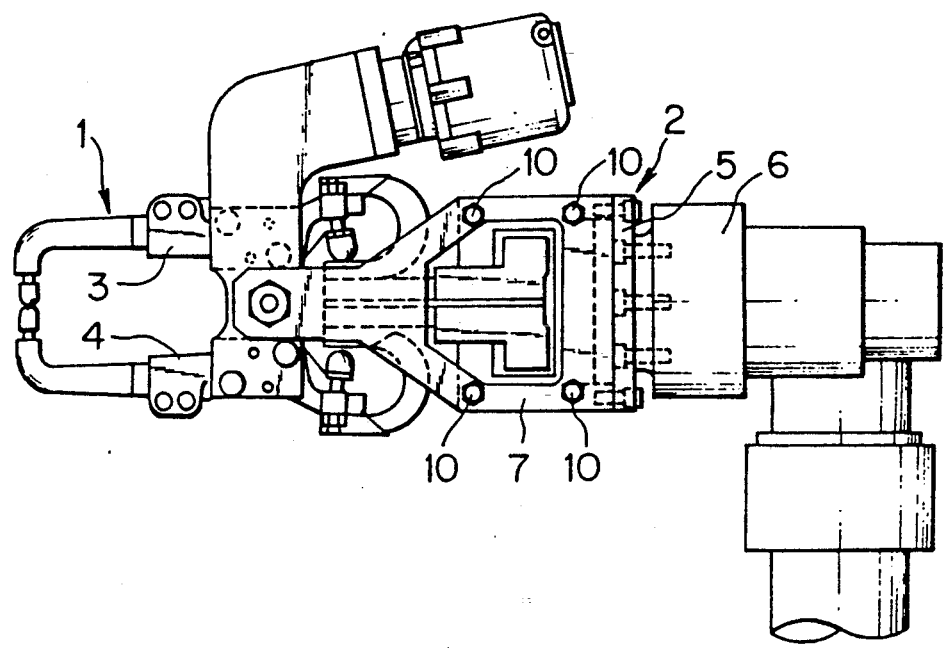
FIG. 1 is a side view of a welding transformer in a welding gun for robot according to a preferred embodiment of the present invention.

A welding transformer in a welding gun for robot will be described with reference to FIGS. 1 is and 2.

Figure 2:
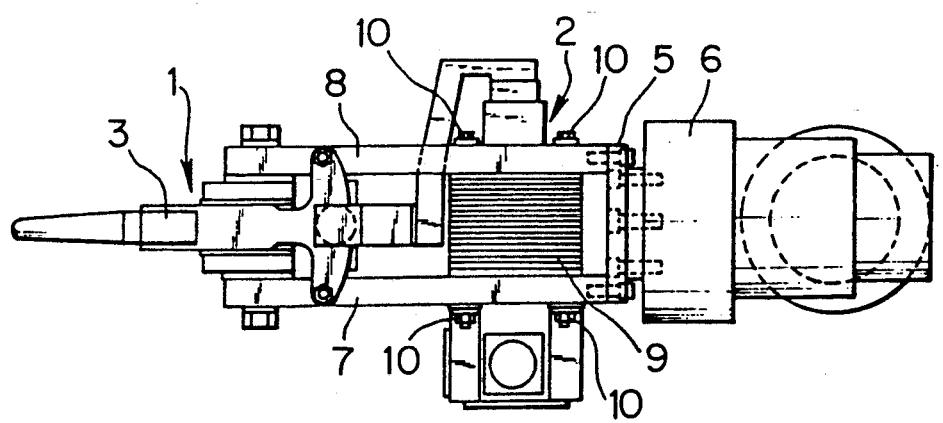
FIG. 2 is a plan view of FIG. 1.
Figure 3:
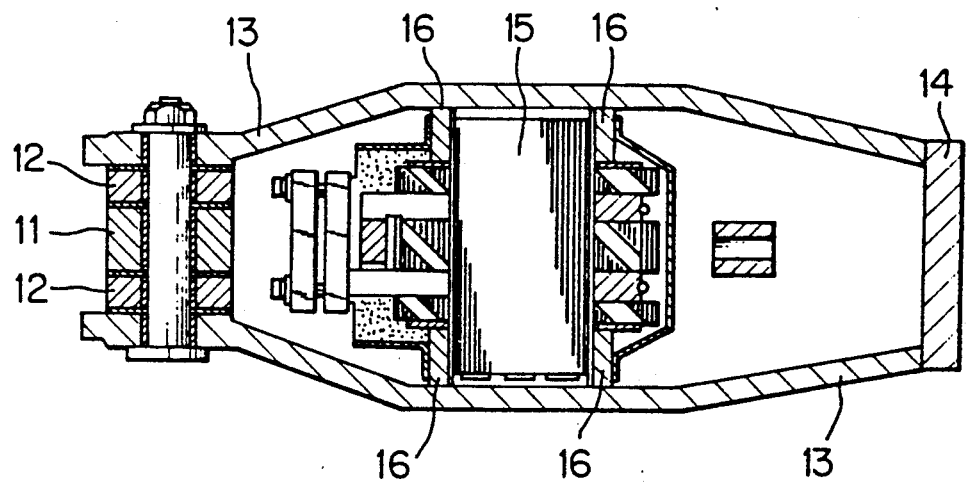
FIG. 3 is a view showing an arrangement of the prior art welding transformer in a welding gun for robot.

In FIGS. 1 and 2, designated at 1 is a welding gun having welding gun arms 3 and 4 pivotally mounted on one end of a cradle 2. The cradle 2 has the other end provided with an attaching portion 5 to which a robot wrist 6 is fixed.

The cradle 2 comprises a hollow frame composed of side plates 7 and 8 and the attaching portion 5. There is disposed in the hollow frame a core 9 which is a constitutent of a welding transformer forming one block by welding. The core 9 is fixed directly to both the side plates 7 and 8 by fastening members 10 composed of bolts and nuts so as to be integrated with the cradle 2 for forming the welding transformer.

In the welding transformer in a welding gun for robot having such a structure, the welding gun 1 approaches the desired work to perform the welding operation by the guide of the arm wrist 6 by way of the cradle 2. When the welding transformer is needed to be replaced with another welding transformer, the cradle 2 is removed from the robot wrist 6 and the cradle 2 having the desired core can be attached both to the welding gun 1 and the robot wrist 6.

With the arrangement of the welding transformer in a welding gun for robot, since the core of the welding transformer is directly fastened to the cradle by the fastening member, the cradle serves as the frame members for holding the welding transformer which entails elimination of the holding frame members. As a result, the welding transformer in a, welding gun for robot weighs less than the conventional one and is optimum as the welding transformer in the welding gun for robot. Furthermore, when the welding transfomer is removed, only the cradle integrated with the core by fastening can be replaced with another cradle, hence the assembling and disassembling of the welding transformer can be made with ease.

Although the invention has been described in its preferred form with a certain degree of particularity, it is to be understood that many variations and changes are possible in the invention without departing from the scope thereof.

What is claimed is:

1. A welding transformer assembly in a welding gun for a robot, comprising:
   a generally hollow frame means defining therein an interior space, said frame means including a mounting portion for mounting a welding gun thereon, and an attaching portion for attachment to a robot wrist, said mounting portion and said attaching portion being respectively disposed at opposite ends of said hollow frame means, and said hollow frame means further including a pair of opposed side plates which extend from said attaching portion toward said mounting portion in generally parallel, spaced relationship, the interior space of said hollow frame means being generally bounded by said mounting portion, said attaching portion and said side plates;

a welding transformer supported on said hollow frame means, said welding transformer including a core which is disposed within the interior space defined by said hollow frame means; and means for fixedly fastening said core directly to said hollow frame means, including a plurality of one-piece fastening members which each extend completely through at least one of said side plates and project into the interior space of said hollow frame means, each said one-piece fastening member co-acting directly with both said core and said one side plate to fixedly fasten said core directly to said hollow frame means, the interior space of said hollow frame means being otherwise free of support structure coacting between said core and said hollow frame means.

2. The welding transformer assembly according to claim 1, wherein each said one-piece fastening member is an elongate bolt which extends completely through said core and both of said side plates.

* * * * *